(12) United States Patent
Pearsall

(10) Patent No.: US 6,643,651 B1
(45) Date of Patent: Nov. 4, 2003

(54) NAVIGATION OF OBJECT LISTS

(75) Inventor: Susan H. Pearsall, Sea Bright, NJ (US)

(73) Assignee: AT&T Corp., New York, NY (US)

( * ) Notice: Subject to any disclaimer, the term of this patent is extended or adjusted under 35 U.S.C. 154(b) by 344 days.

(21) Appl. No.: 09/755,242

(22) Filed: Jan. 5, 2001

(51) Int. Cl.$^7$ ............................................... G06F 17/30
(52) U.S. Cl. ................................ 707/10; 707/3; 707/4; 709/204; 709/218; 709/226
(58) Field of Search ...................... 707/3, 4, 10, 103; 705/101; 709/203, 217, 224, 204, 218, 219, 223, 226, 220

(56) References Cited

U.S. PATENT DOCUMENTS

| | | | | |
|---|---|---|---|---|
| 5,813,007 A | * | 9/1998 | Nielsen ........................ | 707/10 |
| 5,905,990 A | * | 5/1999 | Inglett ........................ | 707/200 |
| 6,055,538 A | * | 4/2000 | Kessenich et al. .......... | 707/101 |
| 6,185,574 B1 | * | 2/2001 | Howard et al. ............. | 707/200 |
| 6,212,265 B1 | * | 4/2001 | Duphorne ............... | 379/142.15 |
| 6,304,898 B1 | * | 10/2001 | Shiigi ......................... | 709/206 |
| 6,327,608 B1 | * | 12/2001 | Dillingham ................. | 709/203 |
| 6,356,898 B2 | * | 3/2002 | Cohen et al. ................... | 707/5 |
| 6,393,479 B1 | * | 5/2002 | Glommen et al. .......... | 709/224 |
| 6,496,837 B1 | * | 12/2002 | Howard et al. ............. | 707/200 |
| 6,505,209 B1 | * | 1/2003 | Gould et al. ................ | 707/102 |

* cited by examiner

Primary Examiner—Jean M. Corrielus

(57) ABSTRACT

This invention provides a navigation device that assists a user to navigate through a list of items. A path sequence traversed by the user through the list of items is recorded and a selection ability such as icons on a display are provided to activate navigation features. The navigation device may provide a toggle feature where the user may flip between the most recently viewed item and a previously viewed item. A navigation back feature may be provided to permit the user to retrace the user's path sequence through the lists so that the user may view again the items that were viewed. In addition, the navigation device may provide a navigation interest feature where the user may select items to be saved in a separate navigation interest directory for later consideration.

18 Claims, 12 Drawing Sheets

NAVIGATION OF OBJECT LISTS

BACKGROUND OF THE INVENTION

1. Field of Invention

This invention relates to navigation of lists of objects.

2. Description of Related Art

Directories are well-known means for navigating through files or objects or any list of objects so that a user may view a directory and select any of the files or objects for more detailed consideration. The directory concept may be further enhanced by applying new technologies.

SUMMARY OF THE INVENTION

This invention provides a navigation device that assists a user to navigate through a list of items. For example, if the list is an e-mail directory, the navigation device generates a navigation directory which records a path sequence traversed by the user through the e-mail directory.

The navigation device may respond to navigation commands to activate features for re-viewing e-mails along the path sequence. The commands may be received via devices such as selection of icons on a display of a user terminal or keystrokes in response to audio prompts. For example, the navigation device may provide navigation toggle, back and interest icons. The navigation toggle icon permits the user to flip between a most recently viewed (or otherwise considered) e-mail message and a previously viewed e-mail message; the navigation back icon permits the user to retrace the path sequence so that the user may view again the e-mail messages that were viewed; and the navigation interest icon allows the user to select e-mail messages for saving for later consideration. The saved e-mail messages may be indexed by a navigation interest directory.

The navigation device may assist the user in navigating through lists of any types of objects such as web sites, web pages, product lists or lists of pictures or music samples, for example. In each case, the navigation device records the path sequence traversed by the user and provides the capability to review the considered items and to select any of the considered items for special consideration at a later time.

BRIEF DESCRIPTION OF THE DRAWINGS

The invention is described in relation to the following figures wherein like numerals reference like elements, and wherein.

DETAILED DESCRIPTION OF PREFERRED EMBODIMENTS

Figure 1:
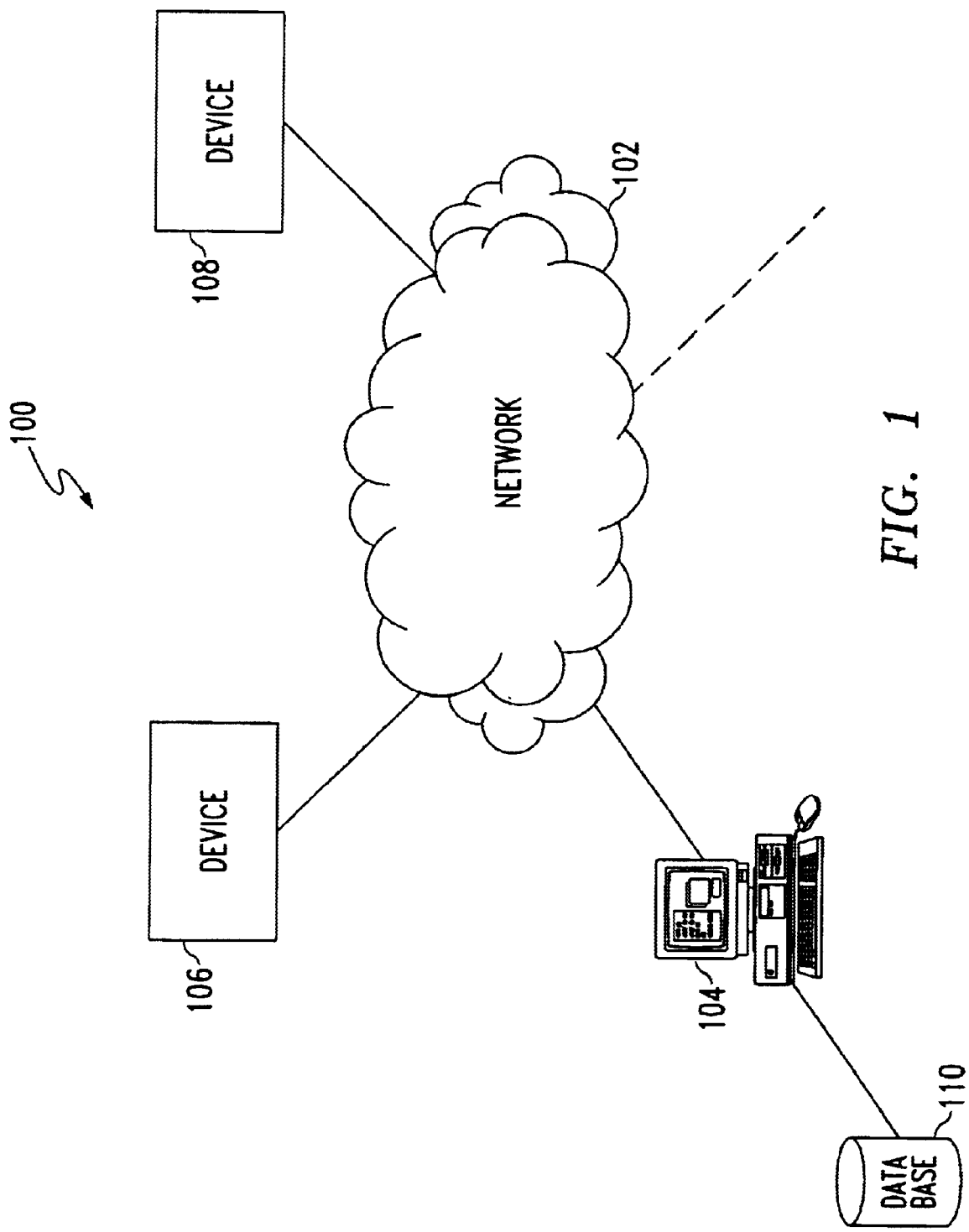
FIG. 1 is an exemplary block diagram of a navigation system.

This invention provides a navigation technique that greatly increases a user's ability to navigate through lists of items. For example, when viewing electronic mail (e-mail), a list (or directory) of e-mail messages is usually provided by a browser. The user may scroll down the directory and select any one of the listed e-mail messages for more detailed viewing. After viewing several e-mail messages and desiring to return to a message that was viewed earlier, the user may be confronted with two circumstances: (1) browser permitting, a window may be displayed for each of the e-mail messages that was viewed. Thus, the terminal screen may be completely covered with windows, making it difficult to-find the particular window that is displaying the message of interest; and (2) when the browser only displays one e-mail message, the user must review the e-mail directory to find the desired e-mail message. In either of the above circumstances, the user is required to find the desired e-mail message without any assistance.

The invention provides a navigation device that assists the user in remembering a path sequence of e-mail messages that was viewed by the user and provides techniques for revisiting viewed e-mail messages. For example, the navigation device indexes e-mail messages that are viewed in a navigation directory. The navigation device may provide several icons so that the user may select (or click) the provided icons to navigate through those e-mail messages that have already been viewed by the user.

The navigation device may be used to navigate through lists of any types of items. For example, when web surfing, different web pages may be visited and various products that are offered by each of the web pages may be of interest. The navigation device may build a navigation directory to index the items that are selected for detailed viewing so that after an extended web surfing session, the user may view again the selected items based on the navigation directory of the complete surfing path sequence traversed by the user. The user may navigate through the navigation directory itself to create a second more reduced navigation directory. In this way, a final list of interested items may be generated.

The navigation device may save information such as the address in the navigation directory, so that each of the entries in the navigation directory may serve as a hyperlink to redisplay the corresponding item. In this way, the complete World Wide Web may be treated as a single resource from which interested items may be obtained. Other information may also be saved in the directory such as user comments, priority indication, etc.

In view of the above, when considering any collection of items in a sequential manner, the navigation device may record a path sequence of items traversed by the user. In addition, the navigation directories themselves may be similarly treated so that a final list of interested items may be easily created. While, as discussed above, the navigation device may be used to view objects of any kind, the following description will use e-mail as an example for ease of understanding. Also, while the invention is described using the e-mail example using a terminal with a visual display, the invention may be practiced using devices such as a cell phone without visual display capability, for example. In such cases, the "display" is simply an audio signal and the user may input commands via keystrokes of a telephone dial pad, for example.

FIG. 1 shows a navigation system 100 that includes a network 102, a navigation terminal 104 and devices 106 and 108 coupled to the network 102. The navigation terminal 104 may also be coupled to a database 110. The network 102 may include one or more networks of various types such as intra-nets, wide area networks (WANs), telephone networks, data networks, etc. The devices 106 and 108 may be various suppliers that provide product information over the network 102 which may be viewed by the navigation terminal 104, or any other terminals that may be accessed by the navigation terminal 104 to view or retrieve information.

The navigation terminal 104 may be any communication device that may be adapted for this invention, such as personal computers, personal digital assistants (PDAs), cell phones, telephone stations, or other wired or wireless devices which may communicate over the network 102 to view or receive information. In cases where the navigation terminal 104 does not have sufficient processing capability, the function of the navigation terminal 104 described hereafter may be performed in a navigation device in the network 102 or as a stand-alone unit (e.g., a device that interfaces with a user terminal). The navigation device may receive commands from the user via keystrokes and output information audibly via a voice synthesizer, for example.

The database 110 may be a resource that is directly accessible by the navigation terminal 104. For example, the database 110 may be a hard disk that is housed within the navigation terminal 104 or may be a database accessible via a private or public network. For example, the database 110 may also be accessible via the network 102.

When the user, using the navigation terminal 104, surfs the network 102 to view web pages provided by the devices 106 and 108, for example, the navigation terminal 104 may build navigation directories so that the user may navigate through web sites that have been traversed by the user to review and further select items of interest. The same operation may be performed with respect to the database 110.

Figure 2:
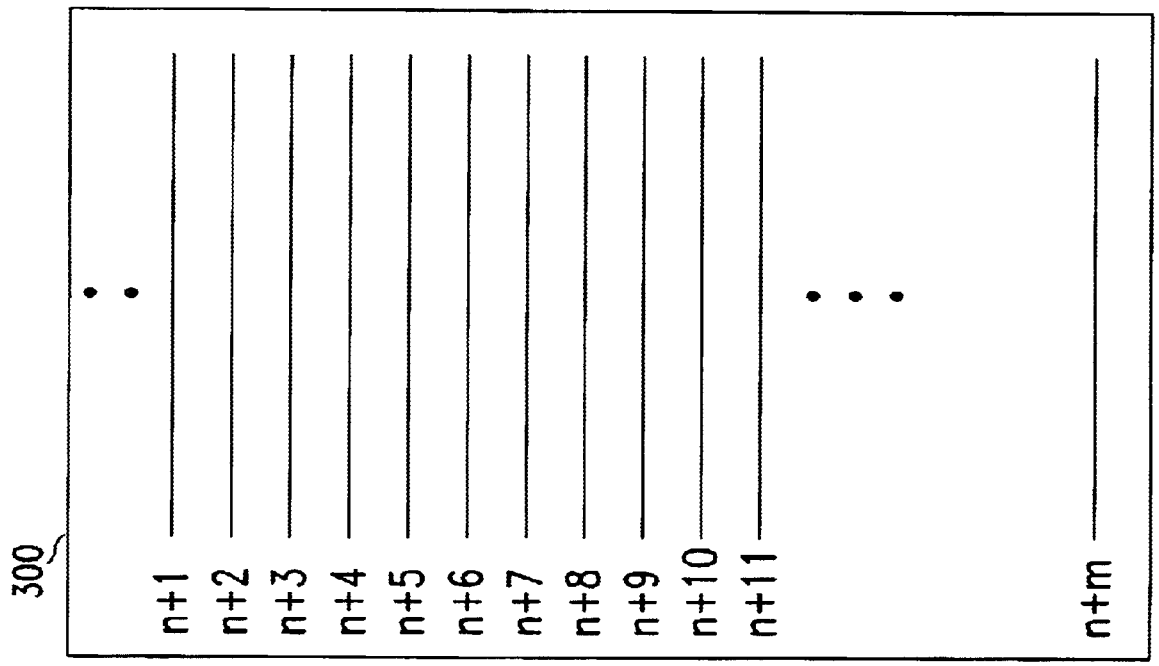
FIG. 2 is an exemplary block diagram of a list of objects.

For the e-mail example, the user may view an e-mail directory on a display of the navigation terminal 104. FIG. 2 shows an exemplary e-mail directory. For example, the directory 300 includes n+m e-mail messages, of which m e-mail messages are represented by the horizontal lines.

Figure 3:
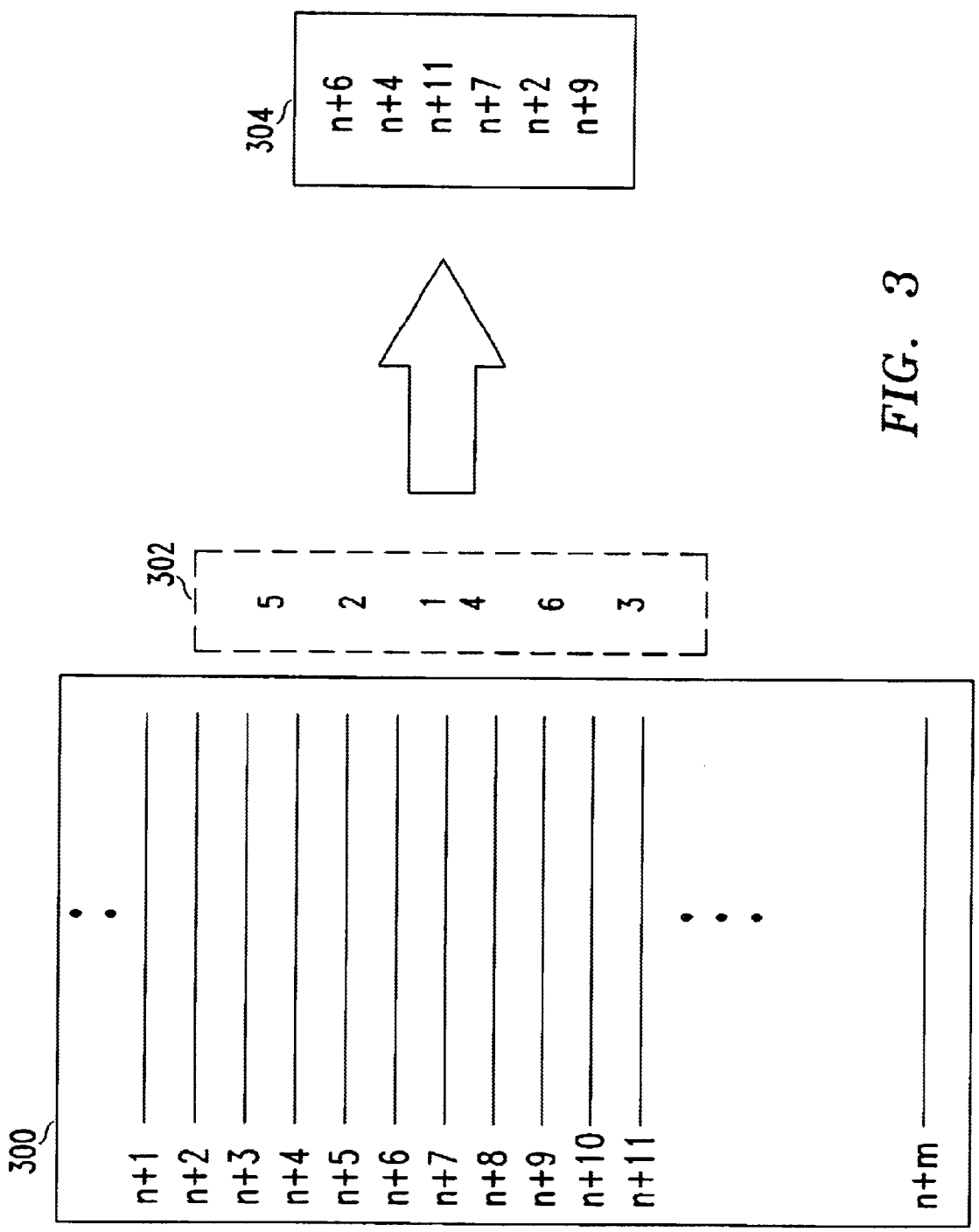
FIG. 3 is an exemplary diagram of a navigation directory.

FIG. 3 shows the user traversing through the directory 300 in a path sequence represented by the numbers 302. For example, the user may have selected e-mail messages in the following order: n+6, n+4, n+11, n+7, n+2, and n+9. The navigation terminal 104 generates a navigation directory 304 as shown on the right side of the arrow in FIG. 3. Thus, e-mail message at n+6 is placed at a tail (first one selected) of the navigation directory followed by other e-mails viewed by the user. The e-mail at n+9 is at a head of the directory and is the latest e-mail viewed (or currently being viewed).

Figure 4:
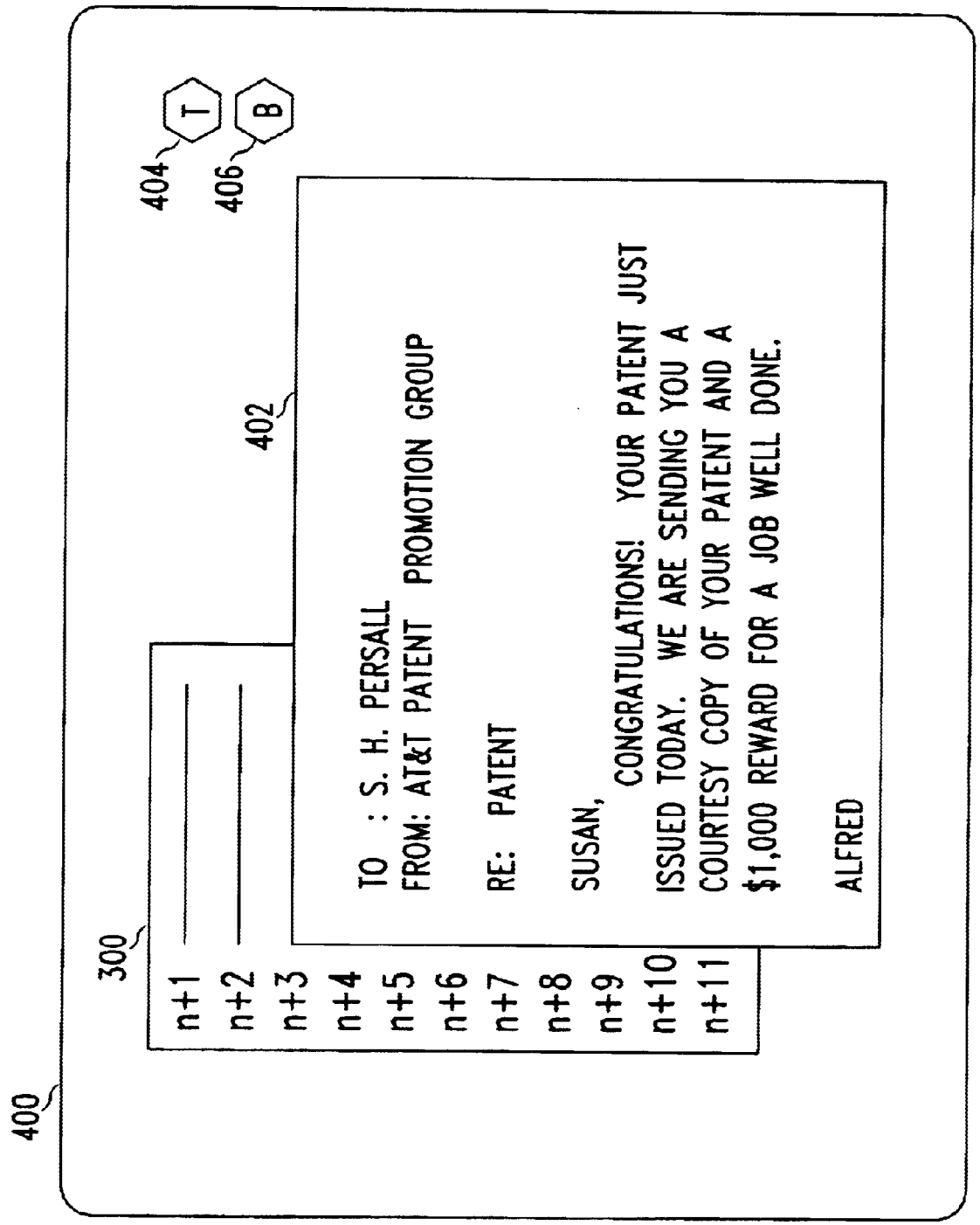
FIG. 4 is an exemplary navigation terminal screen.

FIG. 4 shows a display screen 400 of the navigation terminal 104 that may be displayed to the user while viewing the e-mail 402 (e.g., e-mail message at n+9). The navigation terminal 104 may display a navigation toggle icon 404 and a navigation back icon 406. The navigation toggle icon 404 permits the user to toggle between an e-mail message at the head of the navigation directory and an e-mail message that had been viewed earlier.

Figure 5:
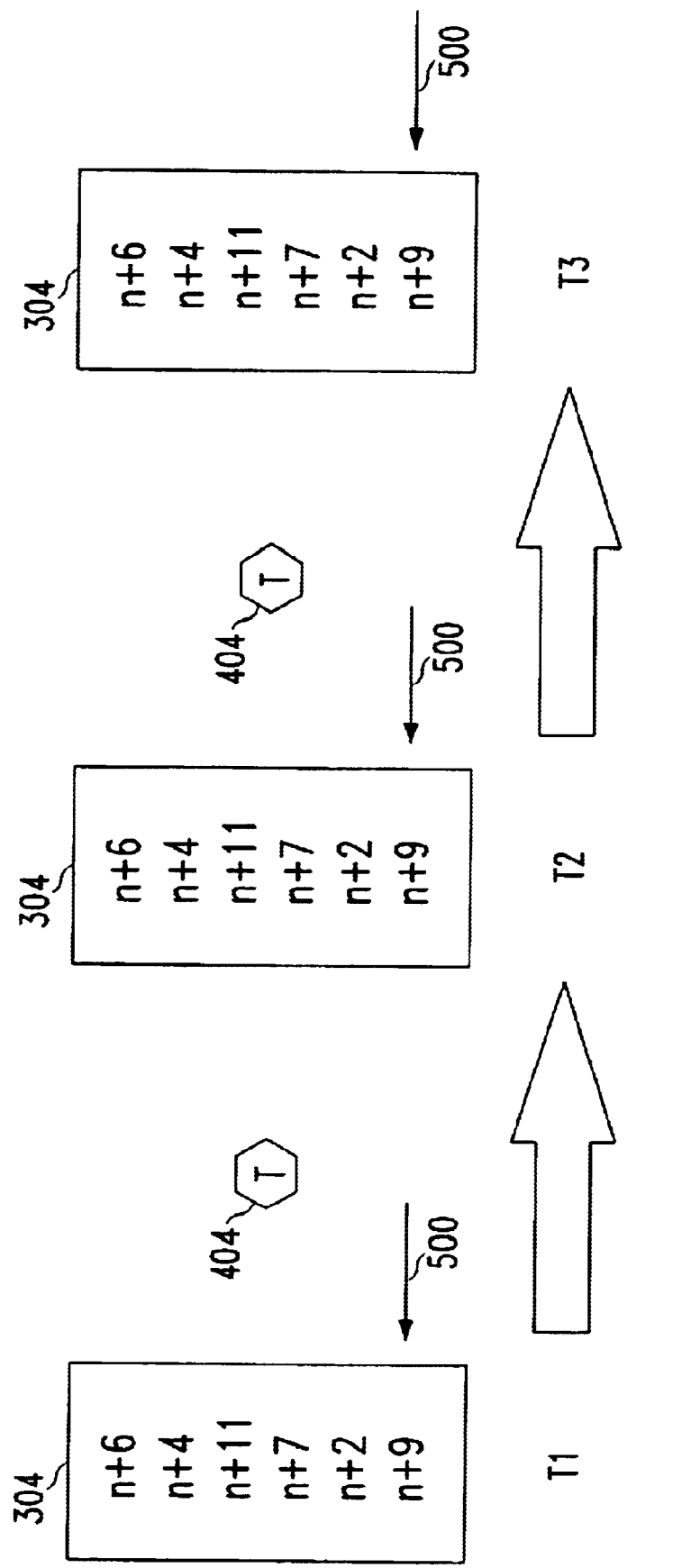
FIG. 5 is an exemplary diagram of a navigation toggle process.

FIG. 5 shows the function of the navigation toggle icon 404. The navigation directory 304 is shown replicated at times T1, T2 and T3. At T1, a pointer 500 points to the latest e-mail message at n+9 which is currently being viewed by the user. When the user clicks on the navigation toggle icon 404, the navigation terminal 104 displays the e-mail message at n+2 which was viewed just before the latest e-mail message at n+9. Thus, at T2, the pointer 500 points to n+2. If the user clicks the navigation toggle icon 404 again, the navigation terminal 104, returns to the latest e-mail message at n+9. Thus, the pointer 500 returns to n+9 at time T3.

Figure 6:
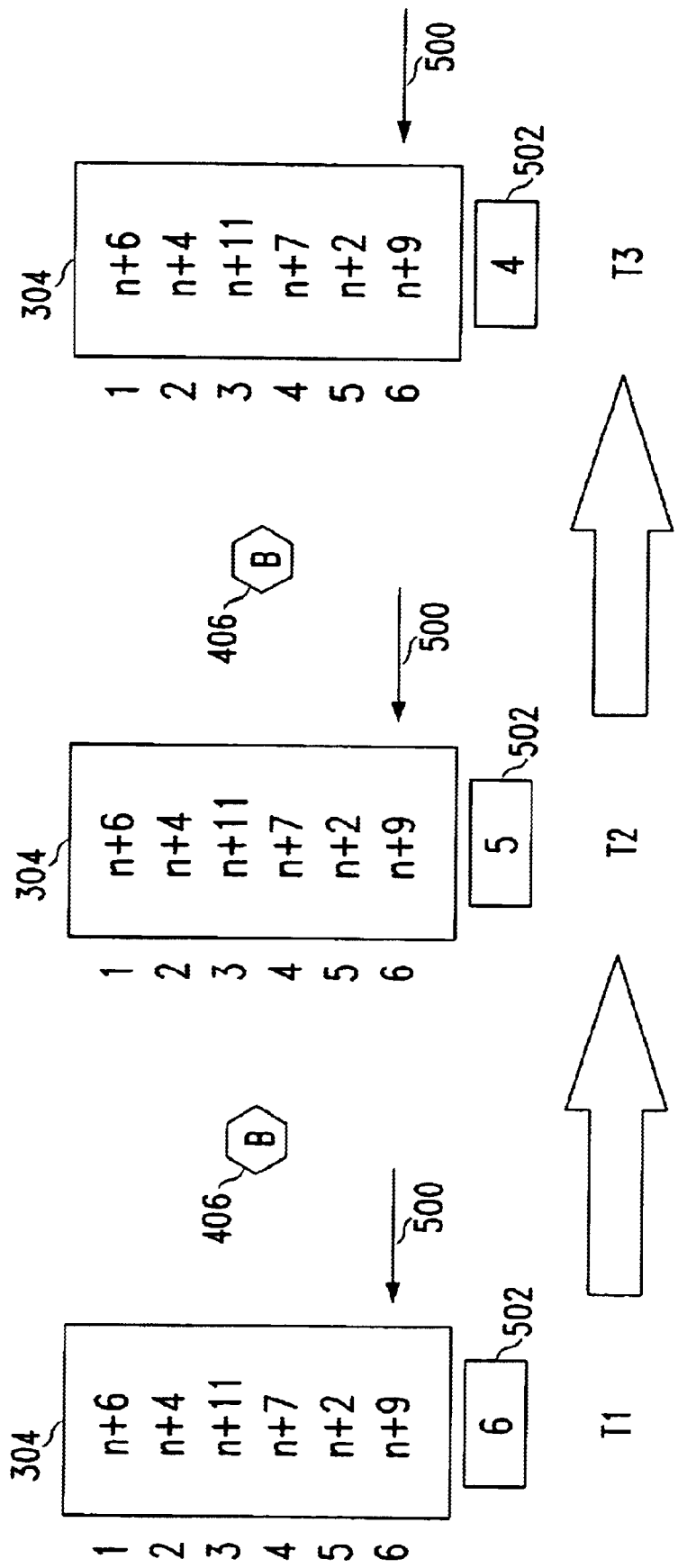
FIG. 6 is an exemplary diagram of a navigation back process.

FIG. 6 shows the function of the navigation back icon 406. As in FIG. 5, the navigation directory 304 is shown at times T1 to T3. To support the functions of the navigation back icon 406, the navigation terminal 104 maintains a history register 502. At T1, the navigation terminal 104 places a path sequence number of the latest e-mail message that was reviewed in the history register 502. Thus, at T1, the history register 502 is set to 6 and corresponds to the pointer 500.

When the user clicks the navigation back icon 406, the navigation terminal 104 moves the pointer 500 to the e-mail message one earlier in the path sequence than the latest e-mail message at n+9. Thus, the pointer 500 is moved to point to the e-mail message at n+2, and 5 is placed into the history register 502. If the user clicks the navigation back icon 406 again, the navigation terminal 104 moves the pointer 500 back by one additional e-mail message along the path sequence and points to the e-mail message at n+7. Thus, at time T3, 4 is placed into the history register 502 indicating that the e-mail message currently being viewed is two e-mail messages back from the latest e-mail message at n+9.

Figure 7:
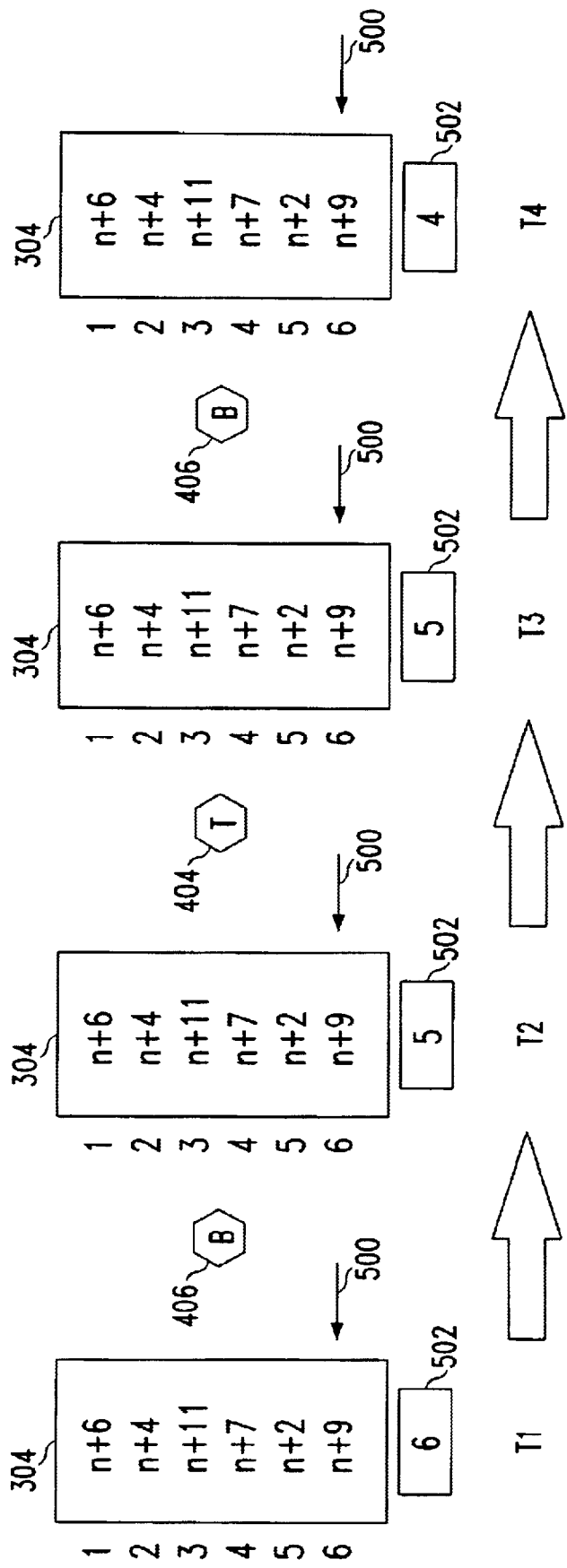
FIG. 7 is an exemplary block diagram of a combination of the navigation back and navigation toggle processes.

The navigation back icon 406 and the navigation toggle icon 404 may be used in any sequence. For example, FIG. 7 shows the navigation directory 304 at T1 with the pointer 500 pointing at the latest viewed e-mail message at n+9 and the history register 502 at 6. When the user clicks the navigation back icon 406, the navigation terminal 104 moves the pointer 500 to the e-mail message at n+2 and places 5 in the history register 502. Thus, at time T2, the user is viewing the e-mail message at n+2. If the user now clicks the navigation toggle icon 404, the navigation terminal 104 returns the pointer 500 to the head of the path sequence which is the e-mail message at n+9. However, the history register 502 retains the path sequence number of 5. If, at this point, the user clicks the navigation back icon 406, the navigation terminal 104 moves the pointer 500 to the e-mail message at n+7 and places path sequence number 4 into the history register 502.

The description above provides example functions of the navigation toggle and back icons 404–406. Other variations may also be performed. For example, instead of leaving the history register 502 at path sequence number 5 at time T3 in FIG. 7, the history register 502 may be set to 6. A subsequent click of the navigation back icon 406 may return the pointer 500 to n+2 again. In this way, the navigation back icon operation is more intuitive and may be more easily used with a less capable navigation terminal 104 such as a plain telephone station, for example.

Figure 8:
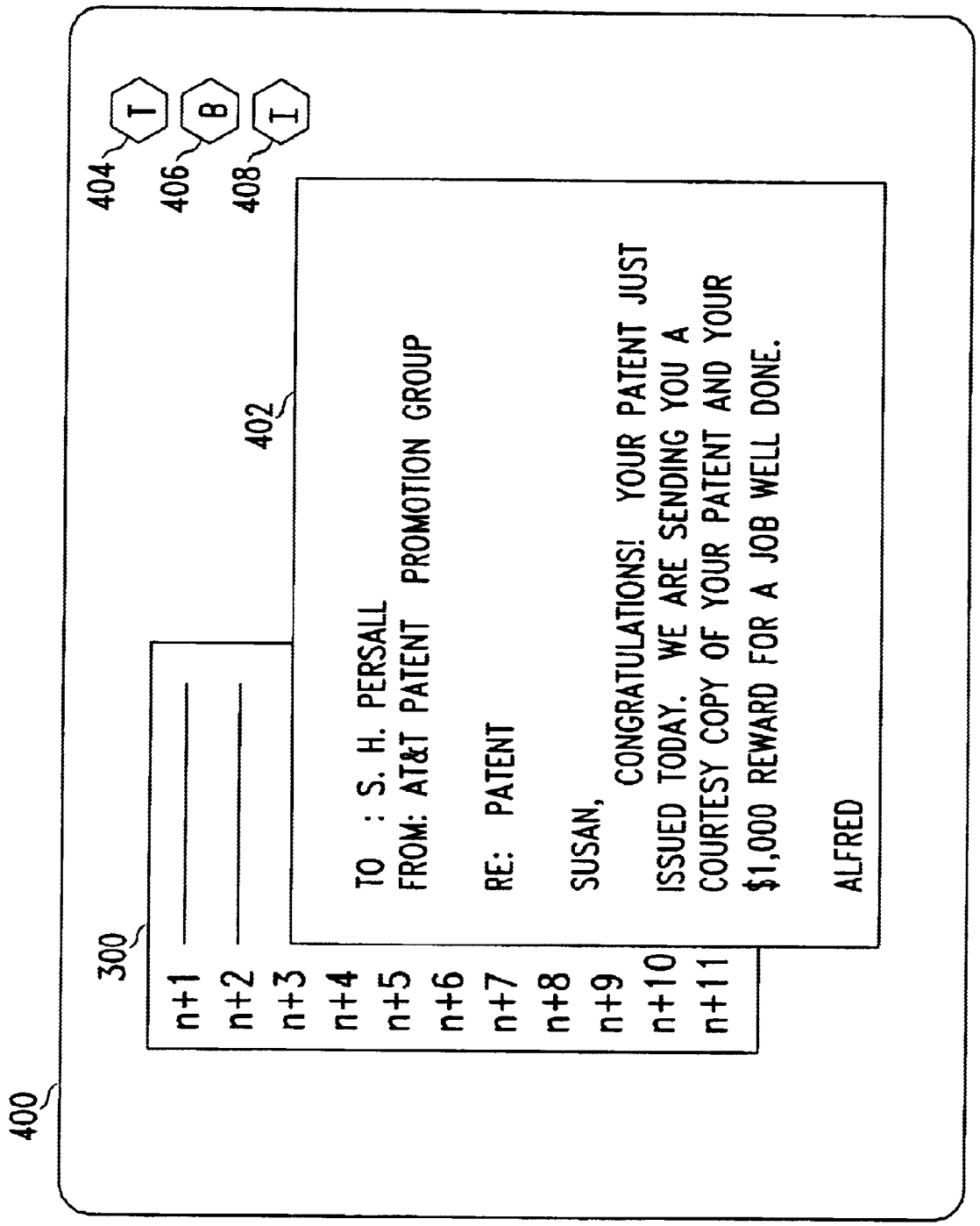
FIG. 8 is an exemplary navigation terminal screen for a navigation interest feature.
Figure 9:
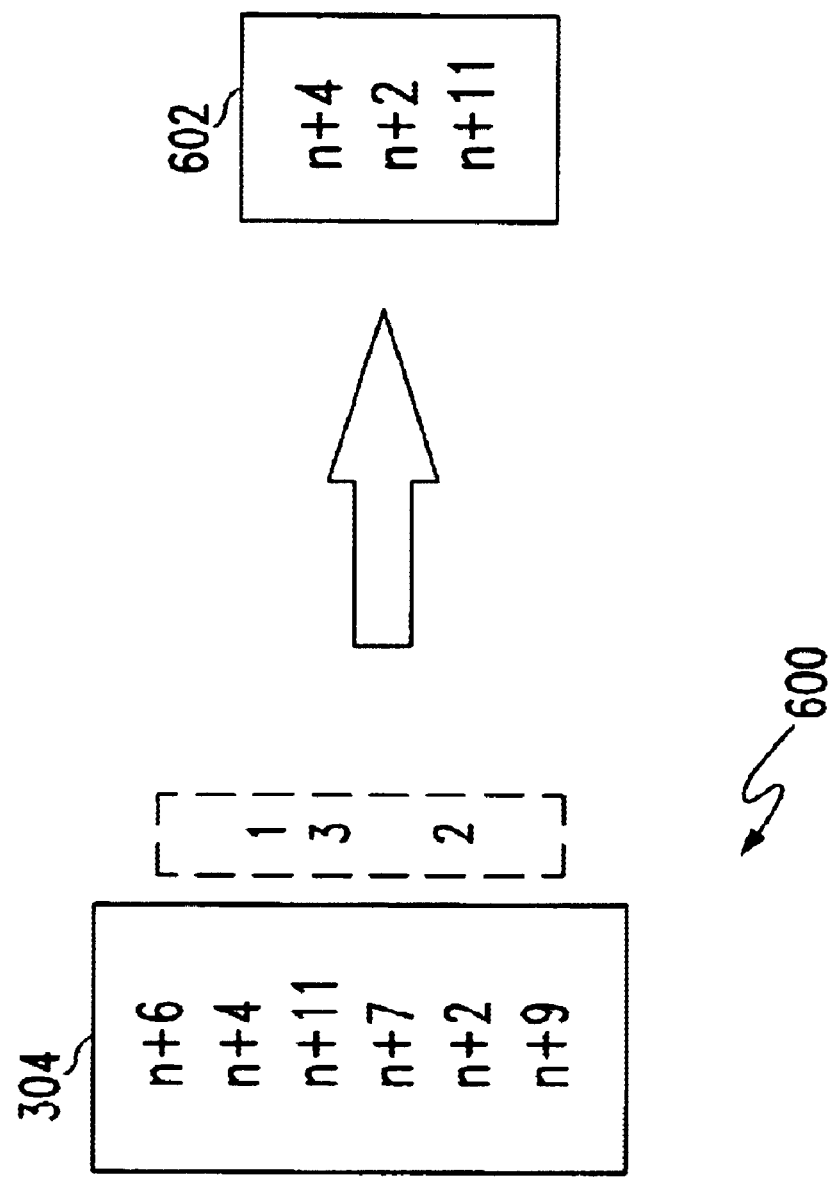
FIG. 9 is an exemplary diagram of a navigation interest directory.

The navigation terminal 104 may also provide a navigation interest directory that is a list of items that the user indicates to be of special interest. FIG. 8 shows a display screen with a navigation interest icon 408. When the user clicks the navigation interest icon 408, the navigation terminal 104 indexes a currently viewed e-mail message into a navigation interest directory 602 as shown in FIG. 9. For example, as the user views various e-mail messages in the navigation directory 304, the user clicks the navigation interest icon 408. In response, the navigation terminal 104 indexes the e-mail messages selected at the time of the click into the navigation interest directory 602. As shown in FIG. 9, e-mail messages at n+6, n+2 and n+11 were clicked in this order as indicated by numbers 600. The navigation interest directory 602 is generated as shown in FIG. 9. In this way, the user may select viewed e-mail messages of special interest and create a reduced list of e-mail messages to be viewed at a later time, for example.

Table 1 below shows an example of the navigation directory 304. The navigation directory 304 may include a path sequence number field that contains a path sequence number of each e-mail message, an e-mail address field which includes information that may permit the navigation terminal 104 to hyperlink to the e-mail directly. For example, the e-mail address may include the directory path of the e-mail or an Internet address such as an URL. The navigation directory 304 may also include names that may be obtained from a header of each of the e-mail messages. For example, the e-mail at n+6 may be sent by John K as indicated in the header portion of the e-mail message. This portion of the e-mail message may be automatically the user is using the navigation terminal 104 to shop via web surfing, the name field may correspond to product numbers or model numbers of specific products viewed by the user and the e-mail address may be web site addresses including page information within the web address as well as cursor location at the time the user selected an item.

The user may choose to download specific information that corresponds to each of the entries in the navigation directory 304. Such information may be stored in the navigation terminal 104 and a pointer to the downloaded file may be placed into the navigation directory 304 so that a hyperlink may be constructed to view this downloaded file directly from the navigation directory 304. If not downloaded, the hyperlink may be constructed via appropriate web addresses, for example.

The user may have a user profile that guides the navigation terminal 104 so that desired operations may be performed. For example, the user profile may indicate the type of actions that initiate the navigation terminal operations. Table 2 below shows an exemplary user profile.

TABLE 2

| Navigation Trigger | Navigation Directory Name | New Directory Criteria | Persistence | Save Location | Password | ... |
|---|---|---|---|---|---|---|
| Open File Directories | NavFile | Each Opened Directory | 1 week | c:\windows\personal | @!q4Ed | • |
| Web log on View Email | WebFile Mail | By Day N/A | Permanent Manual | c:\web\navigate N/A | None Manual | • • |
| • | • | • | • | • | • | • |
| • | • | • | • | • | • | • | extracted by the navigation terminal 104 and placed into the name field of the navigation directory 304. Correspondingly, for the e-mail message at n+4, Hiking Club is extracted and placed into the name field. The navigation directory 304 may also include other fields such as comments where the user may enter text, audio or video information, for example, indicating the subject matter or importance of the e-mail message. Additional fields such as priority fields or keywords may be added so that the user may sort the navigation directory to reorder the entries so that the navigation directory 304 may be better organized according to the desire of the user. In such cases, the path sequence numbers may be updated based on the sort.

TABLE 1

| Path Sequence Number | Email Address | Name | Comments | ... |
|---|---|---|---|---|
| 0 | c:\mail\hello.doc | John K | Meeting at 1:00 pm | |
| 1 | www.hotmail.susan/*****/mail.weekend | Hiking Club | Pikes peak trip | |
| 2 | • | • | • | |
| 3 | • | • | • | |
| 4 | • | • | • | |
| 5 | • | • | • | |

As discussed above, the navigation terminal 104 may navigate through lists of items other than e-mail messages. In such cases, the navigation directory 304 may contain information that corresponds to the information shown in Table 1 that is relevant for e-mail messages. For example, if The user profile may include a navigation trigger field, a navigation directory name field, new directory criteria field, a persistent field, a save location field, a password field, etc. The navigation trigger field may indicate what actions that the user may perform to trigger the navigation terminal navigation operations. For example, Table 2 shows that the user desires to activate the navigation terminal 104 to perform navigated functions when file directories are open, when the user logs onto the web and when e-mail is being viewed. The navigation directory name field indicates the name of the navigation directory that the user desires. Various schemes may be devised to uniquely identify these directories based on different navigation sessions. For example, when the user opens a file directory, the navigation terminal 104 may name the navigation directory NavFile0 and save the navigation directory in this directory name (if desired) when the user completes viewing the file directory.

The user may specify when a new navigation directory is to be created by indicating the criteria in the new directory criteria field. For example, Table 2 shows that for "Open File Directories", the user desires a new navigation directory for each file directory that is open. In contrast, for "Web log-ons", the user indicates that a new directory may be created for each day so that the user may log-on and log-off the web multiple times and the path sequence for each session is combined with the path sequence for other sessions, and all the path sequences may be recorded in a single navigation directory for each day.

The persistence field indicates how long the navigation terminal 104 should maintain the navigation directory 304. Table 2 shows that for "Open File Directories", the navigation directory 304 should be maintained for one week and deleted thereafter. For "Web log-ons", the user indicates that the navigation directory 304 should be kept permanently, and for "E-mail", the user indicates a manual persistence which directs the navigation terminal 104 not to store the navigation directory 304 but that the user will decide whether to save the navigation directory 304 or to simply delete it after immediate use.

The saved location field indicates where to save the navigation directories 304. This field simply saves the path name to the directory where the user desires to save the navigation directory 304. The password field indicates a protection that may be desired. For example, Table 2 shows that the user has entered a password for navigation directories corresponding to "Open File Directories" while none is required for web log-on related navigation directories. The "Manual" in the password field indicates that the user desires to decide later whether to have a password for e-mail navigation directories. Other fields may also be added as appropriate.

Figure 10:
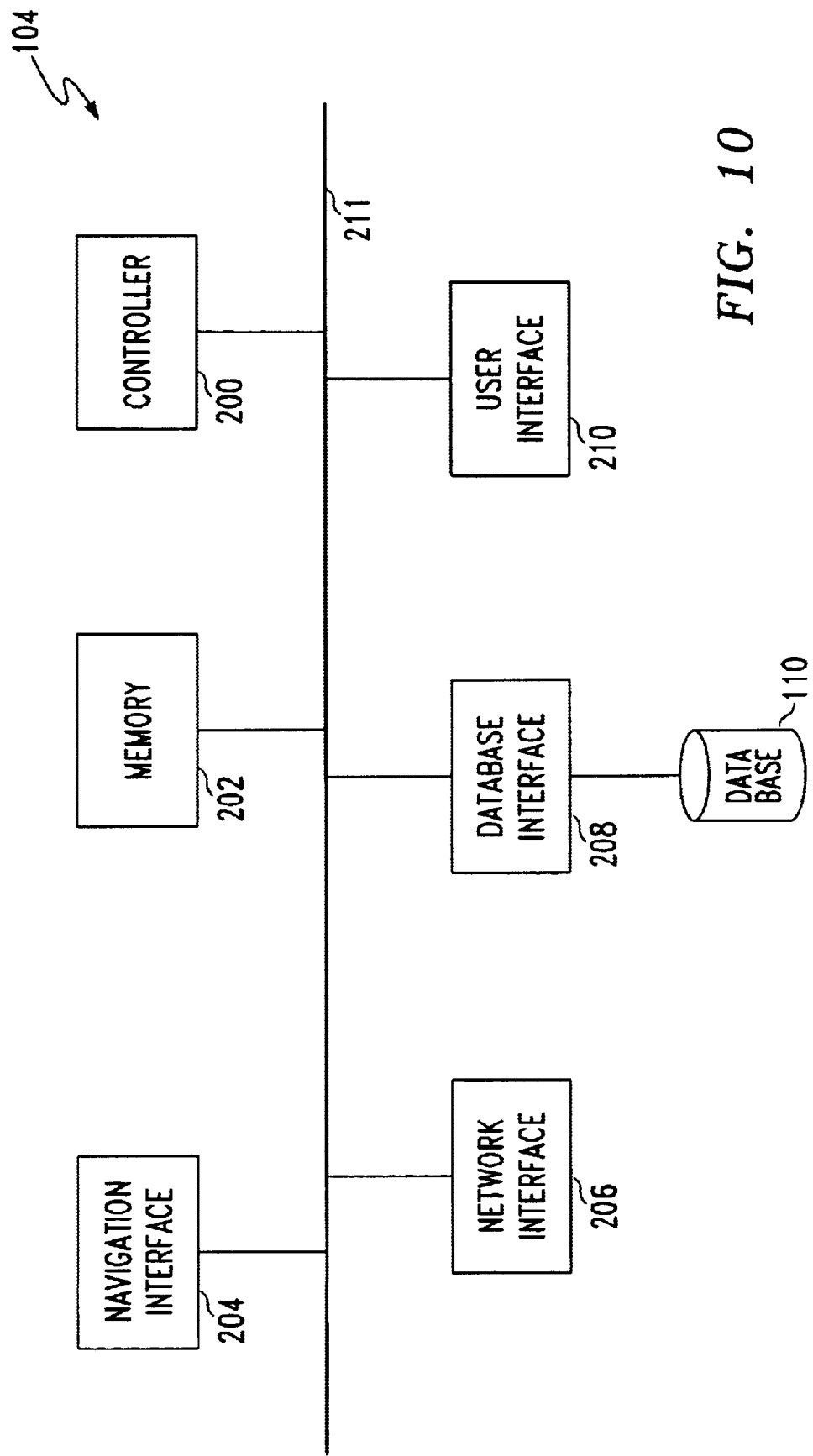
FIG. 10 is an exemplary block diagram of a navigation terminal.

FIG. 10 shows an exemplary block diagram of the navigation terminal 104 that includes a controller 200, a memory 202, a navigation device 204, a network interface 206, a database interface 208 that provides an interface to the database 110 and a user interface 210. The above components are coupled together via a bus 212. While FIG. 10 shows the navigation terminal 104 in a bus architecture configuration, other types of architecture may also be used as is well known to one of ordinary skill in the art.

The user interface 210 may include one or more devices such as keyboards, pointing devices such as a mouse, voice activated command devices, a speaker, a display, etc. The user may use the user interface 210 to surf the Internet, for example, view a directory, select items in the directory or other icons provided on the display, etc. The network interface 206 provides an interface to the network 102, for example. The controller 200 may provide operating system services, application program services, etc. as is well known to one of ordinary skill in the art. The memory 202 may store programs, data items, etc. as is well known.

The navigation device 204 may perform the functions necessary to support the user while navigating through various items among a list of items, for example. When the user opens a directory or begins a viewing process, the navigation device 204 may monitor the user interface 210 and other operations of the navigation terminal 104 via the bus 212 and record a path sequence traversed by the user. When desired, the navigation device 204 may directly interface with the user via the user interface 210 to further navigate navigation directories so that the user may review the path sequence traversed by the user.

The navigation device 204 may be implemented as a program executed by the controller 200 or may be implemented in hardware using well known methods such as PLD, PLA, application specific integrated circuits (ASIC), etc. Thus, as discussed above, the navigation terminal 104 may be any communication device such as a personal computer and the navigation device 204 may be added as an add-on card or loaded as a program.

Returning to the e-mail example, when the user opens an e-mail directory using the user device 210, the navigation device 204 detects this action based on the user profile that may be stored in the memory 202 to determine whether there are any persistent navigation directories 304 stored. If no persistent navigation directories 304 are stored, the navigation device 204 creates a new navigation directory 304 for the current session and initializes the navigation directory 304 operation by creating the history register 502, for example.

If the user has indicated that the navigation directories 304 are persistent, the navigation device 204 may retrieve the corresponding navigation directories 304 from the location indicated in the user profile. If the user profile indicates that the persistence is manual, then navigation device 204 may query the user whether the user desires to continue recording the current e-mail navigation together with a prior navigation directory 304 that may be previously stored.

When the user opens a file, the navigation device 204 collects the information needed for the corresponding navigation directory 304 and stores the collected information in a new entry in a navigation directory 304. If the user has indicated that comments are desired in the navigation directory 304, the navigation device 204 may query for such comment. Alternatively, the navigation device 204 may provide an icon on the display of the navigation terminal 104 and query for comments only if such icon is clicked.

The navigation device 204 continues to monitor user actions and store the path sequence until the opened directory is closed. When closed, the navigation device 204 saves the navigation directory 304 if the navigation directory 304 is indicated to be persistent and ends the process.

The navigation device 204 may also combine navigations of multiple directories into a single navigation directory 304. The user may indicate such a desire in the user profile so that the navigation device 204 may continue to monitor file openings and closings until all the directories that are opened are closed or until the user explicitly closes the navigation session.

While the user is viewing files of a directory, the navigation device 204 monitors whether the navigation toggle icon 404, the navigation back icon 406 or the navigation interest icon 408 have been clicked. If clicked, the navigation device 204 performs the navigation functions as discussed earlier. Additionally, if the user double-clicks icons 404 or 406, for example, the navigation device 204 may display the navigation directory 304 so that the user may randomly select any of the entries in the navigation directory for immediately viewing the underlying information (e.g., e-mail message). Similarly, if the user double-clicks the navigation interest icon 408, the navigation interest directory may be displayed to the user. If the user decides to view the navigation directory 304, a new navigation directory 304 may be created by the navigation device 204 to record the path sequence traversed by the user through the navigation directory 304. If at any time the user clicks the navigation interest icon 408, the currently selected item may be placed into the navigation interest directory. In this way, the user is provided an ability to collect information from various different types of directories, web sites items, etc. into a single directory to be saved and considered at a later time, for example.

Figure 11:
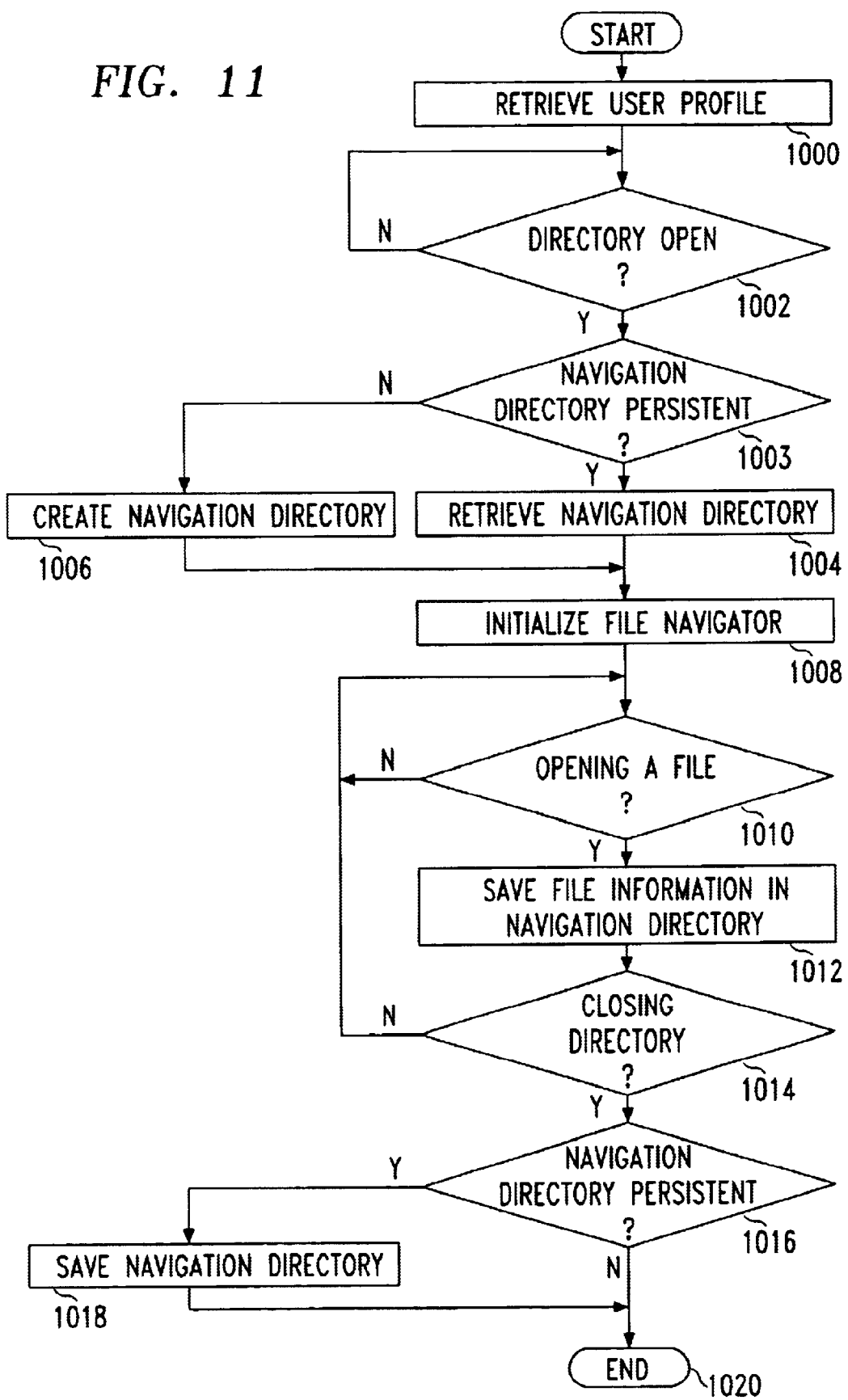
FIG. 11 is a flowchart of an exemplary process for opening and closing navigation directories.

FIG. 11 shows a flowchart for an exemplary navigation device process for navigating through a single directory. In step 1000, the navigation device 204 retrieves the user profile and goes to step 1002. In step 1002, the navigation device 204 determines whether the user has opened a directory. If opened, the navigation device 204 goes to step 1003, otherwise, the navigation device 204 returns to step 1002. In step 1003, the navigation device 204 determines whether the navigation directory 304 is persistent. If persistent, the navigation device 204 goes to step 1004; otherwise, the navigation device 204 goes to step 1006. In step 1006, the navigation device 204 creates a new navigation directory 304 and goes to step 1008. In step 1004, the navigation device 204 retrieves the navigation directory 304 from the directory and path indicated in the user profile and goes to step 1008. In step 1008, the navigation device 204 initializes the navigation terminal 104 by placing various icons 404–408 on the display screen and setting the history register 502 to the path sequence number corresponding to the head of the navigation directory 304, for example. Then, the navigation device 204 goes to step 1010.

In step 1010, the navigation device 204 detects whether the user has opened a file of the directory. If opened, the navigation device 204 goes to step 1012; otherwise, the navigation device 204 returns to step 1010. In step 1012, the navigation device 204 saves the file information in the navigation directory 304 and performs other functions as may be dictated by the user profile and goes to step 1014. In step 1014, the navigation device 204 determines whether the opened directory has been closed. If closed, the navigation device 204 goes to step 1016; otherwise, the navigation device 204 returns to step 1010.

In step 1016, the navigation device 204 determines whether the navigation directory 304 is persistent. If persistent, the navigation device 204 goes to step 1018; otherwise, the navigation device 204 goes to step 1020 and ends. In step 1018, the navigation device 204 saves the navigation directory and goes to step 1020.

Figure 12:
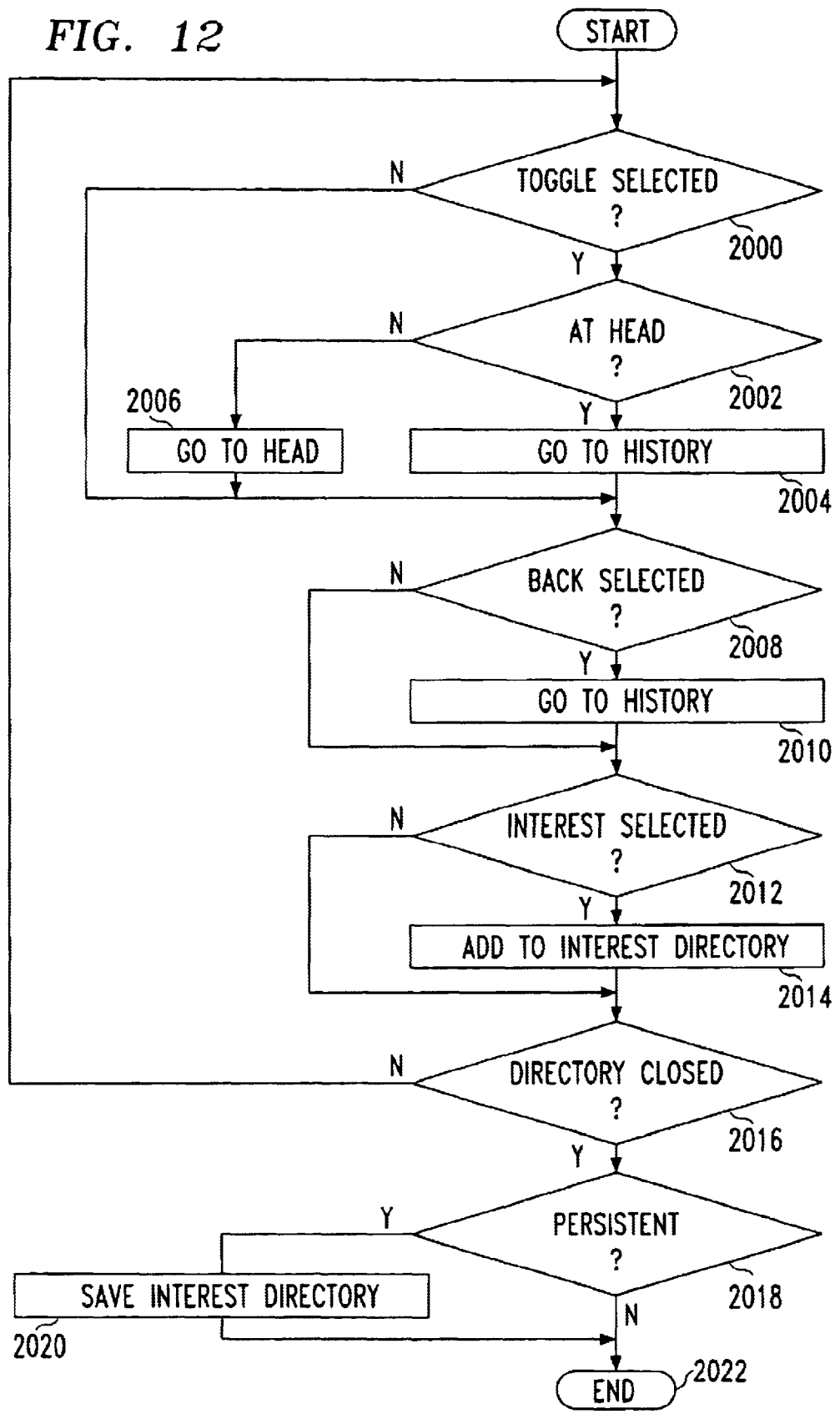
FIG. 12 is a flowchart for an exemplary process for navigation toggle, back and interest features.

FIG. 12 shows a flowchart of an exemplary process for responding to navigation toggle, back and interest icons 404–408. In step 2000, the navigation device 204 determines whether the navigation toggle icon 404 has been selected. If selected, the navigation device 204 goes to step 2002; otherwise, the navigation device 204 goes to step 2008. In step 2002, the navigation device 204 determines whether the pointer 500 is at the head of the navigation directory 304. If at the head, the navigation device 204 goes to step 2004; otherwise, the navigation device 204 goes to step 2006. In step 2004, the navigation device 204 moves the pointer 500 to the location indicated by the history register 502. In step 2006, the navigation device 204 moves the pointer 500 to the head of the navigation directory 304, and goes to step 2008.

In step 2008, the navigation device 204 determines whether the navigation back icon 406 has been selected. If selected, the navigation device 204 goes to step 2010; otherwise, the navigation device 204 goes to step 2012. In step 2010, the navigation device 204 moves the pointer 500 to the location indicated in the history register 502, update the history register 502, and goes to step 2012.

In step 2012, the navigation device 204 determines whether the navigation interest icon 408 has been selected. If selected, the navigation device 204 goes to step 2014; otherwise, the navigation device 204 goes to step 2016. In step 2014, the navigation device 204 adds the selected entry to the navigation interest directory 602 and goes to step 2016.

In step 2016, the navigation device 204 determines whether the current navigation directory 304 is closed. As discussed earlier, the navigation directory 304 may be closed for various reasons as specified in the user profile. If closed, the navigation device 204 goes to step 2018; otherwise, the navigation device 204 returns to step 2000. In step 2018, the navigation device 204 determines whether the navigation interest directory 602 is persistent. If persistent, the navigation device 204 goes to step 2020; otherwise, the navigation device 204 goes to step 2022. In step 2020, the navigation device 204 saves the interest directory 602 and goes to step 2022.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A method for navigating one or more lists of e-mail messages, comprising
   detecting one or more selections of one or more first e-mail messages from the lists;
   recording the selections in a directory in an order based on one or more prior selections;
   receiving commands to select a second e-mail message from the directory; and
   displaying the selected second e-mail message, and wherein the commands include a navigation toggle command, and when the navigation toggle command is received, the method further comprising:
      selecting an e-mail message corresponding to a head of the directory if the e-mail message corresponding to the head of the directory is not being displayed; and
      selecting an e-mail message corresponding to a history location of the directory if the e-mail message corresponding to the head of the directory is being displayed.

2. The method of claim 1, wherein the displaying the selected second e-mail message comprises one or more of:
   outputting the e-mail message audibly;
   outputting the e-mail message visually; and
   outputting the e-mail message in text.

3. The method of claim 1, further comprising:
   detecting an opening of one of the lists based on a user profile;
   retrieving from a memory, or generating the directory based on the user profile; and
   storing information related to the selections of the first e-mail messages in the directory.

4. The method of claim 3, wherein the information related to the selections include one or more of comments, priorities, and keywords.

5. The method of claim 1, further comprising setting the history location to a path sequence number of the head of the directory if the e-mail message corresponding to the head is not being displayed.

6. The method of claim 1, wherein the commands include a navigation back command, and when the navigation back command is received, the method further comprising:
   selecting an e-mail message corresponding to a location of the directory that is one location prior to a history location; and
   decrementing the history location by 1.

7. The method of claim 1, wherein the commands include a navigation interest command, and when the navigation interest command is received, the method further comprising:
   appending an entry in a navigation interest directory corresponding to a selected item in either the lists or the first directory; and
   storing information corresponding to the selected item in the navigation interest directory based on the user profile.

8. The method of claim 1, wherein the commands are received by one or more of detecting clicking of one or more icons that are displayed on a display screen, receiving one or more keystrokes entered via a keyboard, receiving one or more voice commands.

9. The method of claim 1, wherein the order that the selections are recorded in the directory is in time order, each new selection being appended to the prior selections to form a path sequence.

10. A navigation terminal that enables a user to navigate one or lists of e-mail messages, comprising:

a user interface;

a navigation device coupled to the user interface, the navigation device detecting one or more selections, made by the user via the user interface, of one or more first e-mail messages from the lists, recording the selections in a directory in an order based on one or more prior selections, receiving commands, via the user interface, to select a second e-mail message from the directory, and displaying the selected second email message via the user interface, wherein the commands include a navigation toggle command, and when the navigation toggle command is received, the navigation device selects an e-mail message corresponding to a head of the directory if the e-mail message corresponding to the head of the directory is not being displayed, and selects an e-mail message corresponding to a history location of the directory if the e-mail message corresponding to the head of the directory is being displayed.

11. The terminal of claim 10, wherein the navigation device displays the selected second e-mail message by one or more of:

outputting the e-mail message audibly;

outputting the e-mail message visually; and outputting the e-mail message in text.

12. The terminal of claim 10, wherein the navigation device detects an opening of one of the lists based on a user profile, retrieves from a memory, or generates the directory based on the user profile, and stores information related to the selections of the first e-mail messages in the directory.

13. The terminal of claim 12, wherein the user profile information related to the selections include one or more of comments, priorities, and keywords.

14. The terminal of claim 10, wherein the navigation device sets the history location to a path sequence number of the head of the directory if the e-mail message corresponding to the head is not being displayed.

15. The terminal of claim 10, wherein the commands include a navigation back command, and when the navigation back command is received, the navigation device selects an e-mail message corresponding to a location of the directory that is one location prior to the history location, and decrements the history location by 1.

16. The terminal of claim 10, wherein the commands include a navigation interest command, and when the navigation interest command is received, the navigation device appends an entry in a navigation interest directory corresponding to a selected item in either the lists or the first directory, and stores information corresponding to the selected item in the navigation interest directory based on the user profile.

17. The terminal of claim 10, wherein the commands are received via the user interface by one or more of detecting clicking of one or more icons that are displayed on a display screen, receiving one or more keystrokes entered via a keyboard, receiving one or more voice commands.

18. The terminal of claim 10, wherein the order that the selections are recorded in the directory is in time order, each new selection being appended to the prior selections to form a path sequence.

* * * * *